United States Patent [19]

Adachi et al.

[11] Patent Number: 5,528,487
[45] Date of Patent: Jun. 18, 1996

[54] METHOD AND APPARATUS OF CONTROLLING THE POSITIONING OF CORRUGATED BOARD SHEET PROCESSING MACHINE

[75] Inventors: Nokihisa Adachi, Kasugai; Kazumi Kato, Inuyama, both of Japan

[73] Assignee: Kabushiki Kaisha Isowa, Aichi, Japan

[21] Appl. No.: 146,756

[22] Filed: Nov. 2, 1993

[30] Foreign Application Priority Data

Nov. 16, 1992 [JP] Japan .................................... 4-330898

[51] Int. Cl.$^6$ ........................... G06F 19/00; G05B 19/18
[52] U.S. Cl. ................... 364/167.01; 364/474.35
[58] Field of Search .............................. 364/130, 167.01, 364/174, 175, 468–473, 474.13–474.18, 474.28–474.35; 318/601, 466, 569, 570

[56] References Cited

U.S. PATENT DOCUMENTS

| | | | |
|---|---|---|---|
| 3,895,358 | 7/1975 | Pearl | 364/130 |
| 4,114,079 | 9/1979 | Miyakita | 318/601 |
| 4,776,192 | 10/1988 | Oda et al. | 364/472 |
| 4,998,206 | 3/1991 | Jones et al. | 364/468 |
| 5,172,138 | 12/1992 | Okazawa et al. | 318/466 |
| 5,251,142 | 10/1993 | Cramer | 364/474.13 |

*Primary Examiner*—James P. Trammell
*Attorney, Agent, or Firm*—Jordan and Hamburg

[57] ABSTRACT

A method and apparatus is provided for effecting semi-closed loop positioning of a work piece, such as corrugated-board, which corrects for inherent tolerance errors in the apparatus. A controller operates a processing device, for example a slotter, a positioning device and a position measuring device. The processing device and the work piece are positioned relative each other to align the processing device with a target position on the work piece defined by a target position value. The measuring device is then used to determine the initial actual position value of the processing device relative to the work piece. A processing size is determined and tested to find whether the size is within a given tolerance. If the size is outside the tolerance, fine adjustments are made to reposition the work piece. Once the position of the processing device is within tolerance, the measuring device measures the position of the processing device to determine a corrected actual position value. The difference between the initial actual position value and the corrected actual position value is added to the target value to produce a new target position value for subsequent work piece processing.

6 Claims, 3 Drawing Sheets

METHOD AND APPARATUS OF CONTROLLING THE POSITIONING OF CORRUGATED BOARD SHEET PROCESSING MACHINE

BACKGROUND OF THE INVENTION

The present invention relates to a method and apparatus of controlling the positioning of a corrugated board sheet in a processing machine. More particularly, this invention relates to a control method and apparatus which positions various types of processing means, such as a creaser blade and a slotter knife, in a corrugated board sheet processing machine to optimal positions. Fine adjustment (inching manipulation) is performed to set each processing means to the optimal position where a slight error is inevitable due to a peculiarity specific to the corrugated board sheet processing machine despite the processing means being moved to a target value at the time of positioning the processing means.

In the paper industry, a corrugated board sheet processing machine (box making machine) cuts a long corrugated board sheet down to a fixed size and then performs various processes such as printing, creasing and slotting on the sheets cut to size to prepare blanks. Gluing and folding the flap portions of the blanks to yield folded corrugated board boxes is then performed. The box making machine is designed as a combined device having various units arranged in a line including a multi-color printing unit for conducting multi-color printing on sheets of a fixed size, a creaser/slotter unit for making vertical marking on the sheets and slotting the sheets, a hand-hole unit for punching hand holes or the like out of the sheets, and a folder gluer for folding and gluing the sheets. In a corrugator for bonding long webs together to produce a corrugated board sheet, a rotary cutter, for cutting the corrugated board sheet down to a fixed size, is often provided with a slitter for cutting the corrugated board sheet in the vertical direction and a scorer for making horizontal marking. The box making machine generally includes such a slitter and scorer unit.

Each of the units constituting the box making machine is equipped with various types of processing means (e.g., a printing roll and a creaser blade) which directly perform processing such as printing, marking and slotting on arriving corrugated board sheets of a fixed size. The processing means are systematically controlled by a general-control computer system. In accordance with the processing purposes, the processing means are categorized into (1) a type which should be positioned to a fixed position in the rotational direction and (2) a type which should be moved in the axial direction to be positioned to a fixed position. For example, in the printing unit, the plate cylinder should be positioned to a fixed position in the rotational direction and the creaser blade should be positioned in the axial direction of the rotary shaft in accordance with the width of sheets of a fixed size as work pieces. Further, the slotter knife is positioned in the axial direction in accordance with the width of the sheets of a fixed size and is also positioned in the rotational direction to determine the slot length.

The box making machine positions the various types of processing means, such as the creaser blade and the slotter knife, arbitrarily in the rotational direction and axial direction, prior to processing the corrugated board sheet. It is important to improve the positioning accuracy to yield high-quality products. The positioning accuracy that is achieved depends on the following three factors. The precision of positioning the processing means is influenced greatly by (1) the type of the positioning method which is employed in the control system for the box making machine, (2) the mechanical precision of the individual units in the box making machine, and (3) the expansion for computing the specifications of corrugated board boxes to be manufactured. For instance, however high the mechanical precisions of the processing units are or however accurate the expansion of corrugated board boxes is, good positioning accuracy cannot be secured if the positioning method employed in the control system is inadequate. Further, when the expansion of corrugated board boxes is inaccurate, good positioning accuracy cannot be secured even if the other two factors are satisfactory. It is therefore very important to balance out those three factors well in each unit in the box making machine.

The individual units in the existing box making machines manufactured in Japan are supported by excellent manufacturing techniques and have considerably high mechanical precision. However, expansion and contraction caused by a temperature difference, error originating from backlash of a gear system or the like, or error said to be a "peculiarity" of each machine are inevitably present, and there is a limit to eliminating those errors completely. Several proposals have therefore been made on the positioning method of the control system. For instance, a closed loop system may be employed in which a position sensor, such as a linear scale, is attached to movable processing means as a control target, and position information acquired in real time from this sensor is fed back to a servo controller. In this system, a target value based on a control instruction always matches with the current value after positioning, thus ensuring a very high positioning accuracy. The closed loop system has a mechanical system such as a processing means incorporated in the servo loop. However, the mechanical rigidity of such a unit in the box making machine greatly affects the stability of the servo system. A sufficient mechanical rigidity is required which increases the manufacturing cost. Furthermore, corrugated board sheet processing machines do not generally need such high precision to require the use of the costly closed loop system.

There has been proposed a control method disclosed in Japanese Unexamined Patent Publication No. sho 60-40238 for positioning the individual units of a box making machine. The method is a "position feedback system" which uses a current value, acquired by a correction at a time of a previous positioning operation, as a target value in the next positioning operation. The control method employed in, for example, the aforementioned closed loop system that ensures highly-accurate positioning, positions the processing means as specified By the target value or to the corrected value when the next positioning takes place. In this respect, the control method is very effective.

Semi-closed loop systems detect the position, speed, etc. from driving means (motors) of processing means and feed the information back to the control system to provide a significantly high degree of precision control. Such a semi-closed loop system is not inferior to the costly closed loop system. There is also a simple type semi-closed loop system having fewer components than the above systems at the expense of a small reduction in control precision in order to reduce the cost. The simple type semi-closed loop system puts the actual current value in an allowable range of the target value and achieves control without a large variation. The system is favorably employed to control a box making machine unit in a corrugated board sheet processing machine. However, when the simple type semi-closed loop system is used as the basic control system for the box making machine unit, the processing units will not always be positioned as indicated by target values even when under the control of the positioning control system described in the aforementioned Japanese publication. Where a simple type semi-closed loop system has an overrun value of about 1.0 mm at the time of positioning, where positioning is attempted to a target value of 100.0 mm and stops at the position of 101.0 mm, trial processing of a corrugated board sheet is performed right away. If the processed size of the sheet exceeds the allowable range, manual inching may be performed to move the processing means to the optimal value (100.0 mm) and stop it there.

However, even if the current value (100.0 mm) acquired by correction is set as the target value (100.0 mm) for the next positioning as described in the aforementioned Japanese publication, the processing means is positioned near the improper position (101.0 mm) as long as the box making machine unit positions the processing means over the target value by about 1.0 mm. Assuming that this value "101.0 mm" is still within the allowable range of the sheet processing size, if this current value of 101.0 mm is used as the next, corrected target value (101.0 mm ), the processing means will be positioned to 102 mm (101.0 mm+1.0 mm) next time since the box making machine unit tends to shift the processing means by about 1.0 mm to the plus side. In other words, the error is gradually accumulated so that the processing means will be positioned to a further improper position.

SUMMARY OF THE INVENTION

The present invention has been developed to overcome various drawbacks of conventional positioning control methods. An object of the present invention is to provide a control method and apparatus, which positions various types of processing means, such as a creaser blade and a slotter knife, in a corrugated board sheet processing machine to optimal positions. Fine adjustment is performed to set each processing means to the optimal position in the case where a slight error is inevitable even if the processing means is moved to a target value at the time of positioning the processing means.

According to one aspect of the invention there is provided a positioning control method, for a corrugated board sheet processing machine including a control system, processing means for performing operations on a corrugated board sheet, driving means for positioning the processing means relative to the corrugated board sheet, and a control section for controlling the driving means and a position measuring means for monitoring the driving means to determine position data of the processing means and send the position data back to the control section, the method comprising the following steps. A first step includes actuating the driving means according to data representing a target value to position the processing means at a position on the corrugated board sheet designated by the target value. The next step includes measuring and storing an initial actual value of the position of the processing means followed by setting a corrected actual value equal to the initial actual value. After the initial actual value is measured, the following step includes performing trial processing on the corrugated board sheet and measuring a processing size produced by the trial processing. After the trial processing size is found, the next step comprises determining whether the processing size falls within an allowable range. When the processing size does not fall within the allowable range, a step is performed consisting of performing positional correction to move the processing means to a position setting the processing size within the allowable range, measuring a corrected position of the processing means and setting the corrected actual value equal to the corrected position. After positional correction is performed, if required at all, then steps are performed computing a difference between the initial actual value and the corrected actual value after the positional correction, setting a new target value equal to the target value plus the difference for positioning thereafter, and actuating the driving means using the target value replaced by the new target value. Of course, when the positional correction is not required after a target value is set, the target value remains the same because the difference calculated is zero.

According to another feature of the invention there is provided a positioning control apparatus, for a corrugated board sheet processing machine including a control system, processing means for performing operations on a corrugated board sheet, driving means for positioning the processing means relative to the corrugated board sheet, a control section for controlling the driving means, and a position measuring means for monitoring the driving means to determine position data of the processing means and send the position data back to the control section. The apparatus further includes means for actuating the driving means according to data representing a target value to position the processing means at a position on the corrugated board sheet designated by the target value, and means for measuring and storing an initial actual value of the position of the processing means. Further provided are means for setting a corrected actual value equal to the initial actual value, and means for performing trial processing on the corrugated board sheet and measuring a processing size produced by the trial processing. Means for determining whether the processing size falls within an allowable range, and means, responsive to the means for determining, for performing positional correction to move the processing means to a position setting the processing size within the allowable range, measuring a corrected position of the processing means and setting the corrected actual value equal to the corrected position, when the processing size does not fall within the allowable range are included. Computing means are provided for computing a difference between the initial actual value and the corrected actual value after the positional correction, along with means for setting a new target value equal to the target value plus the difference for positioning thereafter. To complete semi-closed loop control, the control section includes means for actuating the driving means using the target value replaced by the new target value.

DETAILED DESCRIPTION OF THE PREFERRED EMBODIMENT

Figure 2:
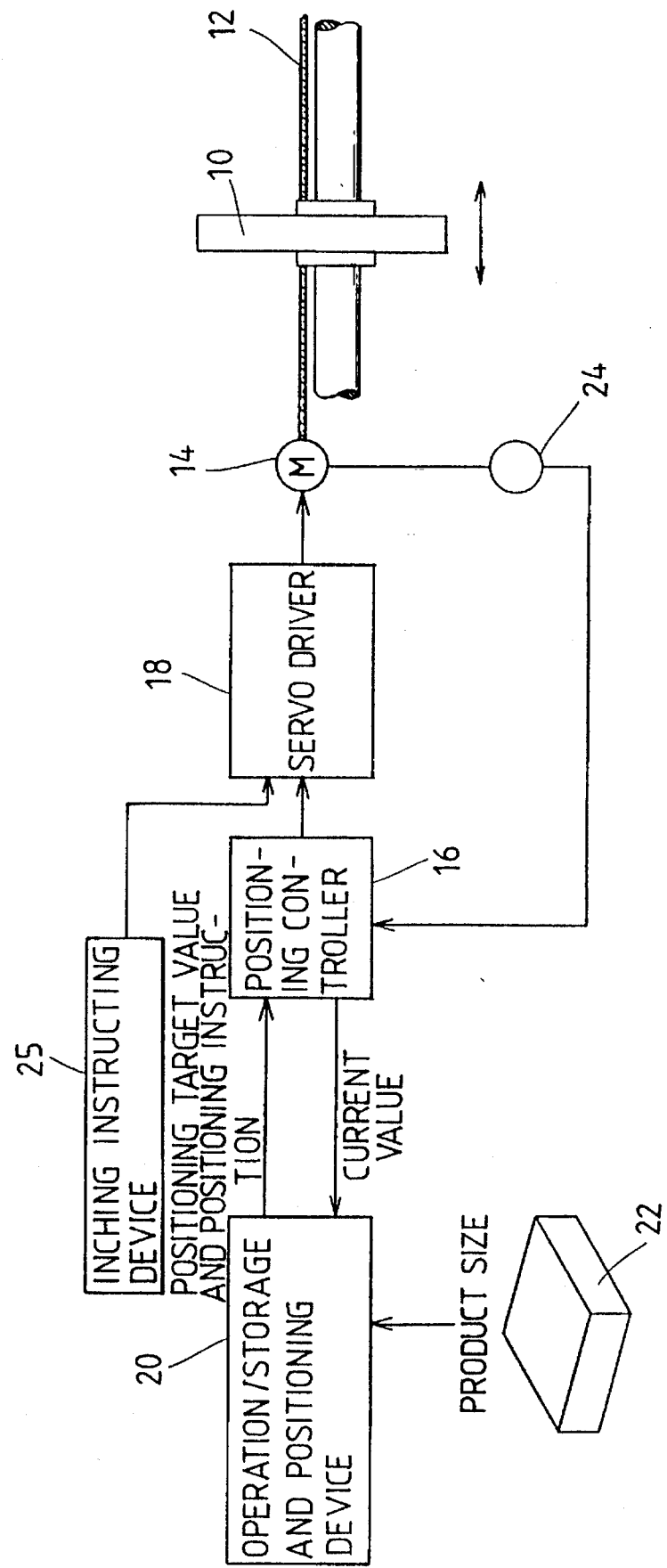
FIG. 2 is a diagram of a control circuit, for a box making machine, which executes the positioning control method of this invention.

A positioning control method and apparatus for a corrugated board sheet processing machine according to a preferred embodiment of the present invention will now be described referring to the accompanying drawings. Referring to FIG. 2, a control circuit for a box making machine which executes the positioning control method is shown. A servo motor 14 is provided in, for example, a creaser assembly (not shown) to cause a screw shaft 12 to move a creaser blade (processing means) 10 to an arbitrary position in the axial direction. A positioning controller 16 gives instructions dictating moving direction and speed to a servo driver 18 to control the rotation of the servo motor 14. An operation/storage and positioning device 20 receives and stores values acquired by the expansion concerning the specifications of a corrugated board box 22 as a final product, such as various sizes, the slot depth and the punching positions of hand holes, and provides the positioning controller 16 with an instruction providing a positioning target value of the creaser blade 10 with respect to each axis. A target value for the next positioning is input to the positioning device 20 from the positioning controller 16 and is stored there. The servo motor 14 has a pulse encoder 24 provided at its drive shaft. A pulse signal from the encoder 24 is fed back as position information to the positioning controller 16. It is assumed that the servo control system shown in FIG. 2 basically employs the aforementioned simple type semi-closed loop system.

As an example, assume that when the control circuit for the box making machine is used in positioning of the processing means, in this instance, the creaser blade 10 overruns by 1.0 mm from a target value Ao of 100.0 mm in a previous positioning, and stopped at a position having an initial actual value Bo of 101.0 mm (100.0 mm+1.0 mm). Trial processing of a corrugated board sheet is then performed and a processed size of the sheet, as actually measured, exceeds the allowable range. In response, inching is then performed to move the creaser blade 10 within the allowable range. A corrected actual value Bn, reflecting a proper processing size 100.4 mm (101.0 mm−0.6 mm) is then read. In this case, a difference Do between the initial actual value Bo at the first positioning and the corrected actual value Bn is 0.6 mm (101.0 mm−100.4 mm). The difference Do, 0.6 mm, is then stored in the positioning device 20 for the next positioning. A new target value An is calculated by subtracting the difference Do 0.6 mm, from the previous target value Ao of 100.0 mm, yielding 99.4 mm, (100.0 mm−0.6 mm), as the new target value An to be used for the next positioning. If the new target value An, 99.4 mm, is given as a control instruction to the positioning controller 16 from the positioning device 20, the servo driver 18 controls the servo motor 14 based on the instructed target position and speed, positioning the creaser blade 10 at a position near about 100.4 mm (99.4 mm +1.0 mm). In other words, in the next positioning or thereafter, the positioning controller 16 gives instructions to the servo driver 18 based on the new target value An (99.4 mm).

Figure 3:
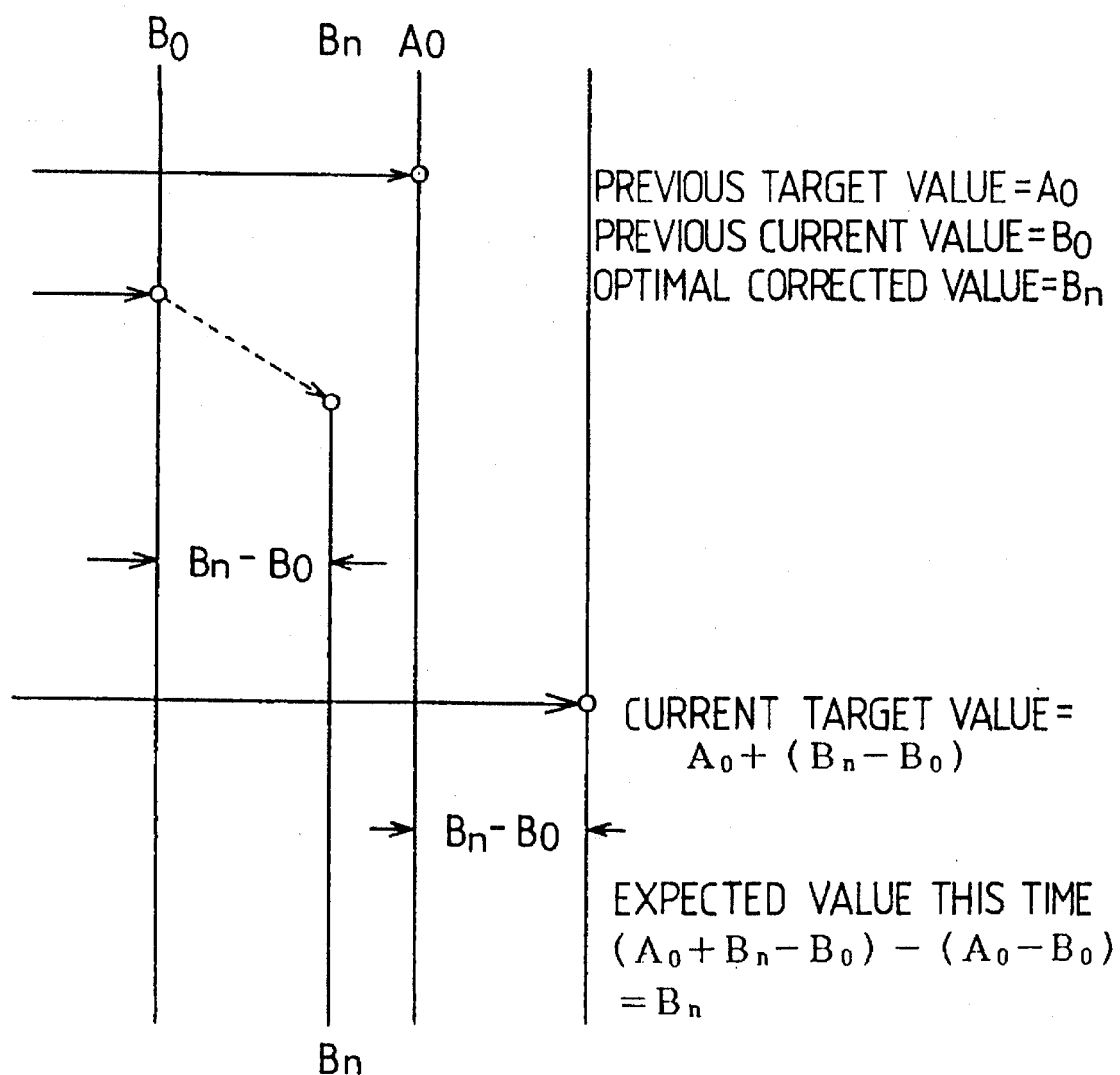
FIG. 3 is a schematic diagram showing the basic concept of the positioning control method according to this invention.

Referring to FIG. 3, the basic concept of the positioning control method according to the invention is schematically shown. Assume that Bo is the initial actual value at the time positioning is executed using Ao as the target value, and that the corrected actual value Bn is measured after inching-oriented correction. In this case, the new target value An is expressed by the target value Ao+(corrected actual value Bn−initial actual value Bo). When positioning is conducted based on the new target value An, the actual value expected this time would match the corrected actual value Bn. That is, corrected actual value Bn is acquired by subtracting the expected positioning error (Ao−Bo), from the target value An, (Ao+Bn−Bo).

Figure 1:
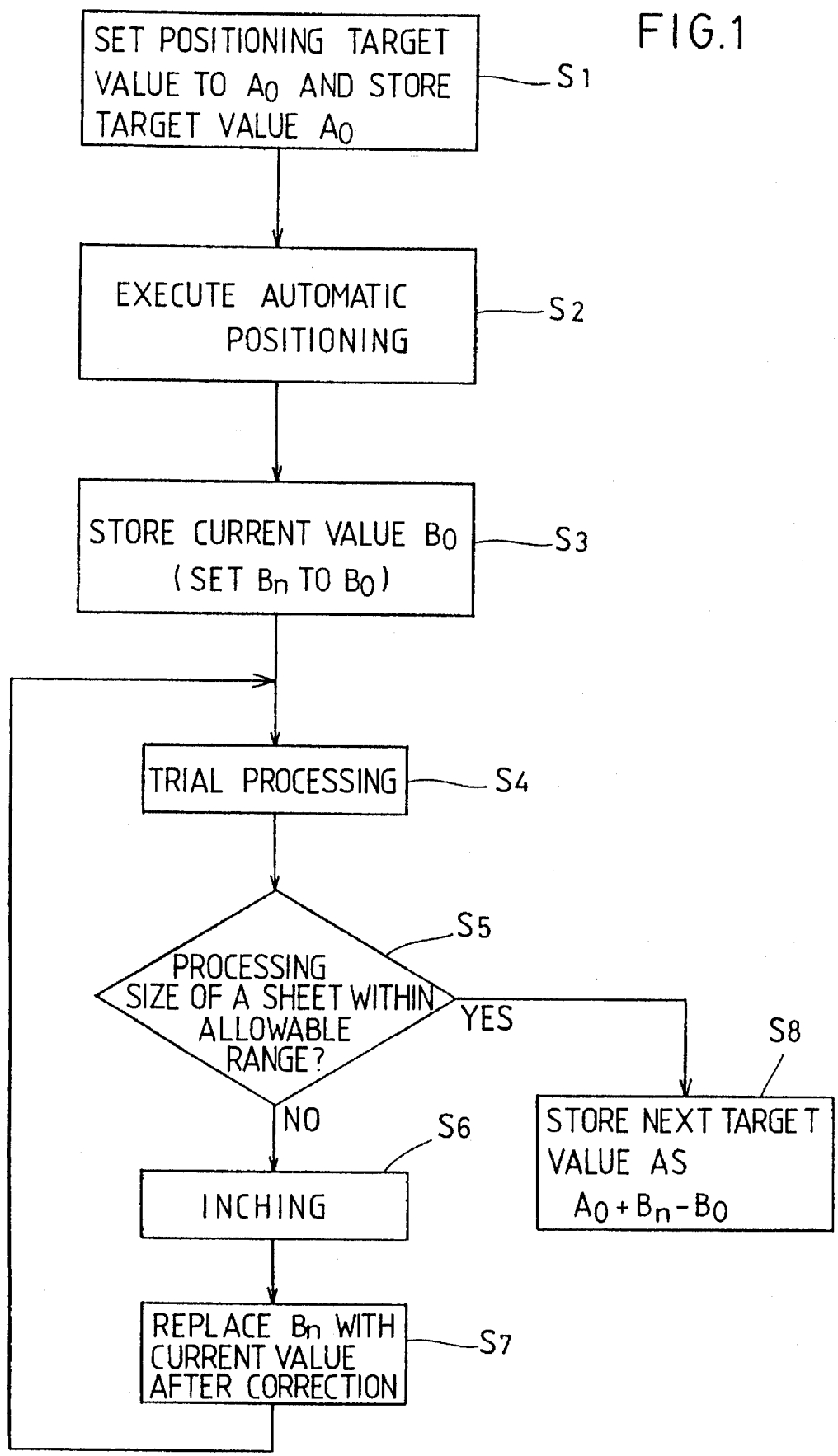
FIG. 1 is a flowchart illustrating a positioning control method according to the present invention.

Referring to FIG. 1, the above positioning control method is shown, step by step, by a flowchart. Suppose that positioning is performed in the aforementioned creaser so that the creaser blade 10 (processing means) is moved a prescribed distance in the axial direction according to the specifications and is stopped there. In this case, the positioning target value Ao is stored in the positioning device 20 in step S1 in FIG. 1. Then, automatic positioning is executed in step S2 to move the processing means 10 a prescribed distance and stop it there. In step S3, the initial actual value Bo, indicating the positioning is measured and stored. At the same time Bo is stored as the corrected actual value Bn.

Trial processing is then performed on the corrugated board sheet in step S4. It is then determined whether the processing size of the sheet falls within an allowable range in step S5. If the decision in step S5 is negative (NO), inching is performed by an inching instructing device 25, shown in FIG. 2, to provide fine adjustment of the position of the processing means 10 in step S6. The prior corrected actual value Bn is replaced with a new corrected actual value after the correction in step S7. The flow returns to step S4 and trial processing on the corrugated board sheet is performed again. If the decision in the aforementioned step S5 is affirmative (YES), the next target value (corresponding to An above) is stored as (Ao+Bn−Bo) in the positioning device 20 in step S8.

The actual positioning control mode will now be described with reference to some specific examples.

EXAMPLE 1

This example illustrates a situation where some correction should be made to the target value (e.g., 100.0 mm) computed from the expansion of a corrugated board box. It is assumed that the mechanical precision in the units of the box making machine is high and the basic control system has a high precision to yield no error at the time of positioning. The conventional system corrects the target value in the expansion as follows in Table 1.

TABLE 1

| Positioning | Target value (mm) | Actual value (mm) |
|---|---|---|
| First | 100.0 | 100.0 |
| | | ↓ (correction by inching) |
| | | 101.0 |
| Second | 101.0 | 101.0 |
| Third | 101.0 | 101.0 |
| Fourth | 101.0 | 101.0 |

The positioning control method according to the present invention corrects the target value in the expansion as follows in Table 2.

TABLE 2

| Positioning | Target value (mm) | Actual value (mm) |
|---|---|---|
| First | 100.0 | 100.0 |
| | | ↓ (correction by inching) |
| 100.0 + (101.0 − 100.0) = | | 101.0 |
| Second | 101.0 | 101.0 |

TABLE 2-continued

| Positioning | Target value (mm) | Actual value (mm) |
|---|---|---|
| Third | ↓ 101.0 | 101.0 |
| Fourth | ↓ 101.0 | 101.0 |

EXAMPLE 2

This example illustrates a situation where, although the target value (e.g., 100.0 mm) computed from the expansion of a corrugated board box is correct, the actual value overruns the target value by 0.2 mm nearly constantly in the control system and mechanical system in the box making machine. An allowable upper limit is 100.7 mm. The conventional system performs positioning as follows in Table 3.

TABLE 3

| Positioning | Target value (mm) | Actual value (mm) |
|---|---|---|
| First | 100.0 | 100.2 |
| Second | 100.2 | 100.4 |
| Third | 100.4 | 100.6 |
| Fourth | 100.6 | 100.8 |
|  |  | ↓ (correction by inching) |
|  |  | 100.0 |
| Fifth | 100.0 | 100.2 |
| Sixth | 100.2 | 100.4 |

It is apparent from the above that the actual value exceeds the allowable upper limit of 100.7 mm when the fourth positioning is complete according to the conventional method. It is therefore necessary to perform inching-oriented correction to correct the actual value to 100.0 mm prior to the fifth positioning. In other words, the positioning error increases accumulatively due to the feedback function.

The positioning control method according to the present invention performs positioning as follows in Table 4.

TABLE 4

| Positioning | Target value (mm) | Actual value (mm) |
|---|---|---|
| First | 100.0 ↓ | 100.2 |
| Second | 100.0 ↓ | 100.2 |
| Third | 100.0 ↓ | 100.2 |
| Fourth | 100.0 ↓ | 100.2 |
| Fifth | 100.0 ↓ | 100.2 |
| Sixth | 100.0 | 100.2 |

According to the present invention, the actual value will never exceed the allowable upper limit of 100.7 mm in positioning. This eliminates the need for the correction of the target value.

EXAMPLE 3

This example illustrates a situation where, although the target value (e.g., 100.0 mm) computed from the expansion of a corrugated board box is correct, the actual value occasionally overruns the allowable upper limit of 100.7 mm due to some inadequacy in the control system and mechanical system in the box making machine. It is assumed that an operator may not correct the actual value even when the actual value overruns the allowable upper limit and that the actual value, if corrected, is not accurately set to the target value. In this case, the conventional system performs positioning as follows in Table 5.

TABLE 5

| Positioning | Target value (mm) | Overrun value (mm) | Actual value (mm) |
|---|---|---|---|
| First | 100.0 | 0.8 | 100.8 |
| Second | 100.8 | 0.8 | 101.6 |
|  |  |  | ↓ (correction by inching) |
|  |  |  | 100.2 |
| Third | 100.2 | 0.6 | 100.8 |
|  |  |  | ↓ (correction by inching) |
|  |  |  | 100.2 |
| Fourth | 100.2 | 0.7 | 100.9 |
|  |  |  | ↓ (correction by inching) |
|  |  |  | 100.0 |
| Fifth | 100.0 | 0.6 | 100.6 |
| Sixth | 100.6 | 0.8 | 101.4 |
|  |  |  | ↓ (correction by inching) |
|  |  |  | 100.1 |

It is apparent from the above that the inching-oriented correction does not set the actual value exactly to the optimal value, but sets the actual value to a proper value within the allowable range. This conventional method therefore requires occasional correction by inching.

The positioning control method according to the present invention performs positioning as follows in Table 6.

TABLE 6

| Positioning | Target value (mm) | Overrun value (mm) | Actual value (mm) |
|---|---|---|---|
| First | 100.0 |  | 100.8 |
|  |  |  | ↓ (cOrrection by inching) |
|  |  |  | 100.2 |
|  | 100.0 + (100.2 − 100.8) = 99.4 |  |  |
| Second | 99.4 ↓ | 0.8 | 100.2 |
| Third | 99.4 ↓ | 0.6 | 100.0 |

TABLE 6-continued

| Positioning | Target value (mm) | Overrun value (mm) | Actual value (mm |
| --- | --- | --- | --- |
| Fourth | 99.4 ↓ | 0.7 | 100.1 |
| Fifth | 99.4 ↓ | 0.6 | 100.0 |
| Sixth | 99.4 | 0.8 | 100.2 |

According to the embodiment of the present invention, the target value needs to be corrected only in the first positioning, and the actual value always falls within the allowable error range thereafter.

It is apparent that the positioning control method of this embodiment of the present invention is considerably effective in the above examples, particularly in the control modes of examples 2 and 3. The control circuit shown in FIG. 2 employs a semi-closed loop system, and the positioning control method of this embodiment may be adapted for a closed loop system, which can itself ensure a high positioning accuracy. If the control method of the embodiment is applied to a situation where a corrugated board box has a complicated shape and it is difficult to acquire the expansion of the box, it is advisable that temporary positioning be performed using the expansion of another proper, temporary box in the first positioning. If the optimal actual value is obtained through positional correction after the temporary positioning is executed, a good position correcting effect can be obtained in accordance with the next target value=target value of the temporary box+(optimal actual value−actual value of the temporary box) as in the case where the nearly-accurate expansion of the box of interest is available from the start.

What is claimed is:

1. A positioning control method, for a corrugated-board sheet processing machine including a control system, processing means for performing operations on a corrugated-board sheet, driving means for positioning said processing means relative to said corrugated board sheet, and a control section for controlling said driving means and a position measuring means for monitoring said driving means to determine position data of said processing means and send said position data back to said control section, said method comprising the steps of:

actuating said driving means according to data representing a target value to position said processing means at a position on said corrugated-board sheet designated by said target value;

measuring and storing an initial actual value of the position of said processing means;

setting a corrected actual value equal to said initial actual value;

performing trial processing on said corrugated board sheet and measuring a processing size produced by said trial processing;

determining whether said processing size falls within an allowable range;

performing positional correction to move said processing means to a position setting said processing size within said allowable range, measuring a corrected position of said processing means and setting said corrected actual value equal to said corrected position, when said processing size does not fall within said allowable range;

computing a difference between said initial actual value and said corrected actual value after said positional correction;

setting a new target value equal to said target value plus said difference for positioning thereafter; and actuating said driving means using said target value replaced by said new target value.

2. The positioning control method according to claim 1, wherein when said corrected actual value is greater than said initial actual value and said difference decreases said target value resulting in said new target value being greater than said target value.

3. The positioning control method according to claim 1, wherein when said corrected actual value is less than said initial actual value said difference decreases said target value resulting in said new target value being less than said target value.

4. A positioning control apparatus, for a corrugated-board sheet processing machine including a control system, processing means for performing operations on a corrugated board sheet, driving means for positioning said processing means relative to said corrugated board sheet, and a control section for controlling said driving means, and a position measuring means for monitoring said driving means to determine position data of said processing means and send said position data back to said control section, said apparatus comprising:

means for actuating said driving means according to data representing a target value to position said processing means at a position on said corrugated-board sheet designated by said target value;

means for measuring and storing an initial actual value of the position of said processing means;

means for setting a corrected actual value equal to said initial actual value;

means for performing trial processing on said corrugated board sheet and measuring a processing size produced by said trial processing;

means for determining whether said processing size falls within an allowable range;

means, responsive to said means for determining, for performing positional correction to move said processing means to a position setting said processing size within said allowable range, measuring a corrected position of said processing means and setting said corrected actual value equal to said corrected position, when said processing size does not fall within said allowable range;

computing means for computing a difference between said initial actual value and said corrected actual value after said positional correction;

means for setting a new target value equal to said target value plus said difference for positioning thereafter; and said control section including means for actuating said driving means using said target value replaced by said new target value.

5. A processing apparatus for adaptively processing a work piece comprising:

a controller having a memory;

a processing means, responsive to said controller, for performing a process on the work piece;

said processing means having a positioner for positioning a tool of said processing means to operate upon a desired location on said work piece in an open loop mode;

measurement means, responsive to said controller, for measuring an actual position of said tool on said work piece;

said controller including means for instructing said processing means to locate said tool at a location on said work piece having a target value;

said controller including means for actuating said measurement means to determine an initial actual value of said location of said tool on said work piece;

said controller including means for determining whether said position of said tool is within a given tolerance;

said controller including means, responsive to said position of said tool being outside said given tolerance, for:
(a) finely adjusting said position of said tool to reposition said tool;
(b) measuring a reposition value of a location of said tool following said fine adjustment and setting a corrected actual value equal to said reposition value; and
(c) redetermining whether said position of said tool is within a given tolerance and repeating (a) and (b) until said position is within said given tolerance;

said controller including means, responsive to said position of said tool being within said given tolerance, for maintaining said target value when said position of said tool remains at said initial position following said determining whether said position of said tool is within a given tolerance; and said controller including means, responsive to said position of said tool being redetermined to be within said given tolerance, for computing a new target value by adding said target value to said corrected actual value minus said initial actual value for use as said target value in subsequent work piece processing.

6. The apparatus of claim 5, wherein said means for maintaining said target value includes means for setting said corrected actual value equal to said initial actual value prior to operation of said means for determining whether said position of said tool is within a given tolerance.

* * * * *